United States Patent [19]

van Rijn

[11] Patent Number: 5,074,537
[45] Date of Patent: Dec. 24, 1991

[54] RECIRCULATING DOCUMENT FEEDER FOR COPYING BOTH SIMPLEX AND DUPLEX DOCUMENTS

[75] Inventor: Gerardus L. J. van Rijn, Lomm, Netherlands

[73] Assignee: Oce-Nederland B.V., Venlo, Netherlands

[21] Appl. No.: 553,627

[22] Filed: Jul. 18, 1990

[30] Foreign Application Priority Data

Jul. 20, 1989 [NL] Netherlands .......................... 8901873

[51] Int. Cl.⁵ .......................................... B65H 85/00
[52] U.S. Cl. ....................................... 271/3.1; 271/65; 271/186; 271/225; 271/902; 355/320
[58] Field of Search ......................... 271/3.1, 184–186, 271/902, 3, 225, 65, 165, 302–304, 275; 355/318–320

[56] References Cited

U.S. PATENT DOCUMENTS

| | | | |
|---|---|---|---|
| 4,066,252 | 1/1978 | Wick | 271/902 X |
| 4,234,180 | 11/1980 | Looney | 271/3.1 |
| 4,238,126 | 12/1980 | Langdon | . |
| 4,419,007 | 12/1983 | Kingsley | 271/3.1 X |
| 4,815,722 | 3/1989 | Sugimoto | 271/3.1 |
| 4,881,729 | 11/1989 | Culligan et al. | 355/318 X |
| 4,884,097 | 11/1989 | Giannetti et al. | 271/186 X |
| 4,923,190 | 5/1990 | Hirose | 271/3.1 |

FOREIGN PATENT DOCUMENTS

| | | |
|---|---|---|
| 0078166 | 5/1983 | European Pat. Off. . |
| 0078680 | 5/1983 | European Pat. Off. . |
| 0211462 | 2/1987 | European Pat. Off. . |
| 159861 | 8/1985 | Japan .................................... 355/320 |
| 295336 | 12/1988 | Japan .................................... 271/3.1 |

Primary Examiner—Robert P. Olszewski
Assistant Examiner—Boris Milef
Attorney, Agent, or Firm—Birch, Stewart, Kolasch & Birch

[57] ABSTRACT

An apparatus for feeding originals from a stack thereof provided in a cassette to an exposure platen within an exposure zone of a copying machine and returning the originals from the exposure zone to the stack, either via a discharge path extending from a feed side of the exposure platen to the stack for returning simplex originals without reversal, via discharge path extending from the discharge side of the exposure platen to the stack for directly returning duplex originals to the stack with reversal, or via a reversing path which combines both of these two discharge paths for returning duplex originals to the exposure platen with reversal and then to the stack. The reversing path includes a reversible conveyor member disposed at a common portion of the two discharge paths just before the stack of originals in the copy machine cassette.

5 Claims, 1 Drawing Sheet

RECIRCULATING DOCUMENT FEEDER FOR COPYING BOTH SIMPLEX AND DUPLEX DOCUMENTS

BACKGROUND OF THE INVENTION

The present invention relates to an automatic document handling apparatus and more specifically to a recirculating document feeder circulating original documents to and from an imaging zone of a copying machine, the recirculating document apparatus being capable of accommodating both simplex and duplex copying.

Heretofore, it has been known to recirculate an original document in a manner which satisfies both simplex and duplex copying such as disclosed in U.S. Pat. No. 4,238,126. A recirculating document handler for both simplex or duplex copying implements fixed platen copying which includes a first oval shaped document return path which directs the original over the platen through a first conveyor path and returns the original to a document containing cassette, reversing the document for duplex copying, and a second document or conveyor path provided diagonally between the document path for duplex copying and the platen or imaging zone for returning documents after copying from the discharge or exiting end of the platen directly to the document containing cassette, without reversal of the document, to satisfy the simplex copying mode. While this apparatus has been found to be useful in recirculating document handlers, it has certain disadvantages. In the first instance in order to accommodate duplex copying, the reversed original must be returned to the top of the stack of documents in the document cassette and await return to the imaging zone while the remainder of the originals go on imaging, thus delaying duplex copying of a particular original. Accordingly, the configuration does not provide for immediate or direct duplex copying if desired. Furthermore, due to the fact that all of the paths returning the original document to the document cassette originate from the discharge side of the fixed platen the overall required size and complexity of the document handler is substantially increased. In addition, the return path for accommodating the simplex copying mode is provided between the exposure station of the fixed platen and the duplex copying return path. Therefore, if a paper jam occurs, it is very difficult to access the respective paths for clearing the jam.

In still a further apparatus for recirculating a document to be copied in either the simplex or duplex copying mode, an apparatus has been designed as taught by European Patent 0078,680 having a duplex copying path and a simplex copying path similar in location to that of U.S. Pat. No. 4,238,126. However, in the case of the latter apparatus, the second conveyor path for returning the original document in the case of simplex copying, to the document cassette, extending from the discharge side of the exposure platen diagonally in the direction of the top of the cassette above the imaging zone between the platen and the first duplex copying return path, includes a second return path for directly returning the original to the exposure platen, with reversal of the original for direct duplex copying. Thus, the combination of the diagonal conveyor path and the second return path for directly returning the reversed original to the exposure platen, extending from the discharge or second side of the exposure platen to the feed or first side of the exposure platen, are positioned between the first conveyor path through the exposure zone over the exposure platen and the first duplex copying return path. In this apparatus, the original to be copied is capable of moving through a first conveyor path directly over the exposure platen forming the exposure zone, and through a first return path which returns the reversed original document to the top of the document cassette for delayed duplex copying, the return path being situated above the first conveyor path. The apparatus is also capable of transporting the exposed original through the diagonally positioned second conveyor path either directly to the document cassette during simplex copying or through the second return path back to the exposure platen for direct duplex copying, this combination of paths being situated between the first conveyor path above the exposure platen and the first return path. Yet, while the latter document recirculating apparatus provides for direct duplex copying, due to the nature of the positioning of the document paths, each of which must be separately accessible, and complexity of the construction, it still remains extremely difficult to clear a document jam.

SUMMARY OF THE INVENTION

Therefore, it is an object of the present invention to provide a recirculating document apparatus for both simplex and duplex copying which will overcome the above-noted disadvantages.

It is a further object of the present invention to provide a recirculating document feeder which will accommodate both duplex copying as well as simplex copying in a more simplified manner.

Yet, still a further object of the present invention is to provide a recirculating document apparatus with both simplex and duplex copying capability such that the respective document paths are readily accessible.

The foregoing objects and others are accomplished in accordance with the present invention, generally speaking, by providing a recirculating document feeder for recirculating originals from a stack thereof to and from an exposure platen which forms an exposure zone of a copying machine. The recirculating document feeder comprises a cassette for stacking the original documents, a feed path extending from the bottom of the cassette to a feed or first side of the exposure zone or platen for directing an original document from the cassette to the exposure platen, a first sheet conveying means such as in the form of an endless conveyor belt for conveying the original through a first conveyor path in the exposure zone above the exposure platen, a first discharge path extending from the discharge or second side of the exposure zone or platen to the top of the document cassette for discharging the original from the exposure zone to the cassette, reversing the original for the purpose of duplex copying, a second conveyor or discharge path extending from the feed or first side of the exposure zone to the termination of the first discharge path at the top of the document cassette and a second sheet conveying means or sheet conveyor member, such as in the form of a roller, placed where the second conveyor path meets the first discharge path, the direction of conveyance of both the first and second conveying means being reversible for changing the direction of the original. The first discharge path for the original document for satisfying duplex document handling extends from the discharge side of the exposure platen to the top of the document cassette. The path for returning the original document to the top of the cassette during simplex imaging is provided between the first or feed side of the exposure platen and the location where the second conveyor path joins the first discharge path near the cassette. This return path between the feed side of the exposure platen and the first discharge path provides the same path for direct duplex copying as further discussed below in conjunction with the reversible sheet conveyor member. Consequently, the total path length required is shortened reducing the risk of jamming of the original documents. This is particularly the case in an apparatus wherein the exposure zone is adapted to position the entire original therein. Due to the fact that the first conveying means or belt is reversible, the original can be discharged from the exposure zone by way of the second conveyor path directly to the cassette without reversal of the original. Further, by reversing the direction of the conveyance of the second conveying means or sheet conveyor roller, the original may be directly returned to the exposure zone for direct duplex copying. In the case of direct duplex copying, the reversal process of the second conveyor path is initiated just before the original is completely returned to the cassette by way of the first discharge path. In either case, the respective discharge or return paths do not overlap thereby making it possible to readily clear a paper jam.

BRIEF DESCRIPTION OF THE DRAWINGS

The invention will be described hereinafter with reference to the accompanying drawings wherein.

DETAILED DESCRIPTION OF THE INVENTION

Figure 1:
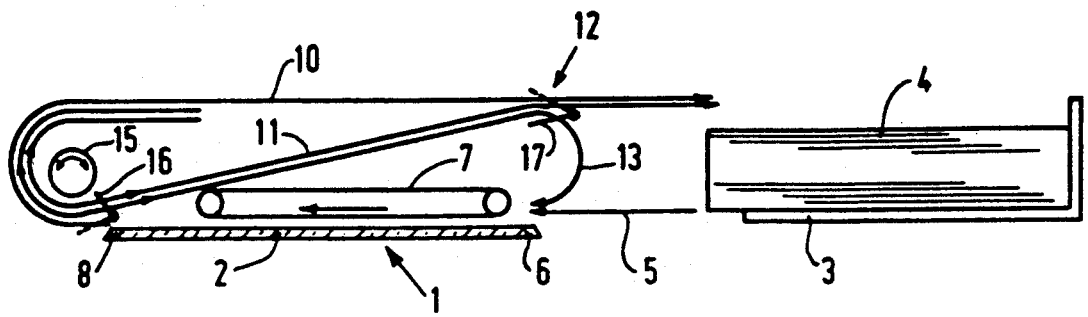
FIG. 1 diagrammatically represents an apparatus for recirculating originals according to the prior art, FIG. 2 diagrammatically illustrates a first embodiment of an apparatus according to the present invention, and FIG. 3 diagrammatically illustrates a second embodiment of an apparatus according to the present invention.

Referring now to FIG. 1, there is seen a known apparatus which comprises an exposure zone 1 in which is disposed an exposure platen 2 of a copying machine. Disposed next to the exposure platen 2 is a cassette 3 in which a stack 4 of originals to be copied can be placed. A feed path 5 extends from the bottom of the cassette 3 to the feed side 6 of the exposure platen 2, which side is situated closest to the cassette 3, for feeding an original to the exposure platen 2 from the bottom of the stack 4. The feed path 5 and the conveyor paths to be described hereinafter are indicated diagrammatically by arrows in the drawings, those arrows which are drawn parallel to one another and close together denoting the same path, with the head of the arrow indicating the direction in which an original can be advanced in the respective path.

A conveyor belt 7 cooperates with the exposure platen 2 in order to transport an original over the platen from the feed side 6 to the discharge side 8, situated opposite the feed side, through the exposure zone 1.

A first discharge path 10 extends from the discharge side 8 of the exposure platen 2 to the top of the cassette 3. This first discharge path 10 comprises a semi-circular curved portion, which adjoins the discharge side 8, and a straight portion which extends from the curved portion to the cassette 3. A second discharge path 11 extends from the discharge side 8 of the exposure platen 2 to the cassette 3. This second discharge path 11 includes that portion of the discharge path 10 which adjoins the discharge side 8 of the platen and a portion which extends diagonally between the discharge side of the platen and a location 12 at the terminal portion of the first discharge path 10 situated approximately directly above the feed side 6 of the exposure platen 2, which diagonal portion is positioned between the exposure platen 2 and the straight portion of the first discharge path 10 above the conveyor belt 7.

The known apparatus also includes a return path 13 extending from the discharge side 8 of the exposure platen 2 to the feed side 6 of the exposure platen 2, which return path 13 is formed by that portion of the first discharge path 10 which adjoins the discharge side 8, that portion of the second discharge path 11 which extends between the discharge side 8 and location 12 of the first discharge path 10 and a semi-circular curved portion which extends between location 12 and feed side 6 of the exposure platen.

A reversible sheet conveyor roller 15 is disposed at the curved portion of the first discharge path 10. In addition a sheet deflector 16 is disposed at the discharge side of the exposure platen 2 which can be set in a position (dotted line) in which an original fed in the direction of the exposure platen 2 by the sheet conveyor roller 15 is guided diagonally in the direction towards location 12, and a sheet deflector 17 is disposed at location 12 which can be set into a position (dotted line) in which an original is returned to the exposure platen 2 by way of return path 13.

Such an apparatus as taught by European Patent 0078,680 is suitable for processing originals printed on one side or both sides.

Originals printed on one side are fed one-by-one from the bottom of the stack 4 to the exposure platen 2 and from there back to the top of the stack 4 via the second discharge path 11 without reversal of the document. This is generally referred to as simplex copying.

Originals printed on both sides can be processed in two ways. First, the originals are fed one-by-one from the bottom of the stack 4 to the exposure platen 2 where one side of the original is exposed, and from there via the first discharge path 10 back to the top of the stack 4 reversing the document. After all of the originals of the stack 4 have been exposed on one side, the originals are once again fed to the exposure platen 2 one-by-one from the bottom of the stack 4, so that the other side of the original is now exposed, and from there returned, via the first discharge path 10, to the top of the stack 4. The originals in the stack 4 are then once again in the same orientation as that in which they were inserted prior to copying. Secondly, the originals are fed one-by-one to the exposure platen 2 from the bottom of the stack 4. After one side has been exposed, each original is returned inverted via return path 13 to the exposure platen 2 for exposure of the other side. Subsequently, each original is returned to the top of the stack 4 via the first discharge path 10. Both processes are referred to as duplex copying, with the first method suitable for use in a copying machine in which first the copy sheets are printed on one side, collected in an intermediate stack, and then printed on the other side, whereas the second method is suitable for use in a copying machine in which all copy sheets are printed on both sides directly one after the other before being returned to the stack.

As discussed above, the known apparatus shown in FIG. 1 is not without its disadvantages in that the several conveyor paths, including the main discharge path 10 and the diagonal discharge path 11, apart from presenting a complex construction, extend one above the other over the entire length of and above the exposure platen 2, which enhances the risk of an original jamming in one of these long conveyor paths. In addition, the diagonal discharge path 11 is difficult to access due to its location. For example, for removal of an original jammed in such portion, therefore, the conveyor system above the exposure platen 2 must, for example, be adapted to hinge up in portions for the purpose of clearing the jam.

The embodiments of the apparatus according to the present invention to be described hereinafter do not have these disadvantages. In the embodiment of the present invention shown in FIG. 2, the feed path 21 between the cassette 23 and an exposure platen 24, and the first discharge path 22 adjoining the discharge side 18 of the exposure platen 24 are constructed in the same way as in the known apparatus described in FIG. 1. On the exposure platen 24 is provided a reversible conveyor belt 25 for transporting the original through a first conveyor path of the exposure zone above the exposure platen 24. Between the feed side 26 of the exposure platen 24 and a location 27 at the terminal portion of the first discharge path 22, situated near the cassette 23, there extends a second discharge path 28. A sheet deflector 29 is disposed at the feed side 26 of the exposure platen 24 and, on movement of the conveyor belt 25 in the direction of the cassette 23, is placed in a position indicated by the broken-line to guide an original into the second discharge path 28 from the exposure platen 24.

A reversible conveyor member or roller 30 is disposed in the first discharge path 22 between location 27, where the second discharge path or conveyor path 28 leads into or coincides with the first discharge path 22 to provide a common portion, and the cassette 23. At location 27 there is disposed a sheet deflector 31 which, when the sheet conveyor roller 30 rotates in a direction opposed to the discharge direction, is placed in a position indicated by the broken line in which an original situated completely between location 27 and cassette 23, but still held fast on the conveyor roller 30, is guided into the discharge path 28 for return to the exposure platen 24 by way of the path 28, so that the discharge path 28 now becomes a feed path.

Figure 2:
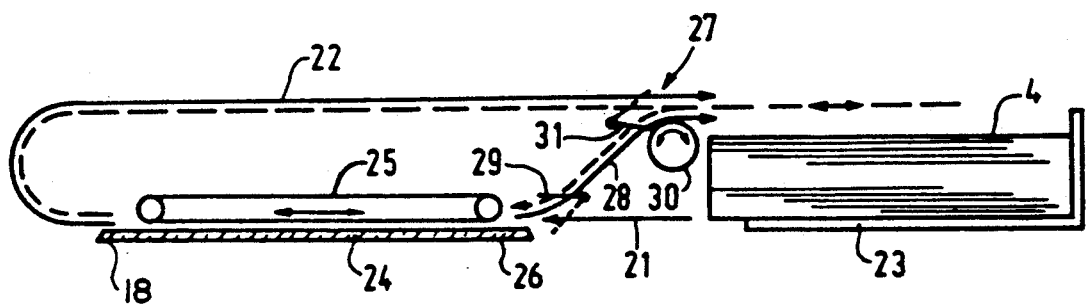

Like the apparatus shown in FIG. 1, the apparatus shown in FIG. 2 is suitable for processing originals printed on one side and for processing originals printed on two sides. Originals printed on one side are fed one-by-one from the bottom of stack 4 in the cassette 23 via the feed path 21 to the exposure platen 24. After exposure of each original the direction of rotation of the conveyor belt 25 is reversed and the sheet deflector 29 is set to the broken-line position, so that each original is returned via discharge path 28 directly to the cassette 23 without reversal of the original. If multiple copies of the one sided original are wanted directly without processing the entire stack of originals, the original is held at the exposure platen 24 during multiple exposure and thereafter returned to the cassette 23.

For processing in a first duplexing manner, originals printed on two sides are fed one-by-one from the cassette 23 to the exposure platen 24 where one side of the original is exposed, and then from there via the first discharge path 22 back to the top of the stack 4 in the cassette 23, reversed. After all of the originals have thus been exposed on one side, they are again fed one-by-one from the cassette 23 to the exposure platen 24, where the other side of the original is now exposed, and from there back to the cassette 23 via the first discharge path 22 in their original state.

For processing two-sided originals in a second duplexing manner, after one side of the original printed on two sides and fed to the exposure platen 24 has been exposed, the original is discharged to the first discharge path 22 and conveyed therein until the trailing edge of that original has passed location 27. The direction of rotation of the conveyor roller 30 is then reversed and sheet deflector 31 is set in the broken-line position. The original is now returned via the second discharge path 28, which now serves as a return path, to the exposure platen 24 for exposure of the other side. That original is then returned via the first discharge path 22 to the cassette, whereupon a subsequent original is fed from the cassette 23 to the exposure platen 24. This is a direct form of duplex imaging.

The return path for direct duplex copying directly returning an original, after one side thereof has been exposed, to the exposure platen 24 for subsequent exposure of the other side of such an original, is thus formed by the first discharge path 22 and the second discharge path 28. This return path is denoted by a broken line in FIG. 2. A conveyor path intended solely for the direct return of an original to the exposure platen 24, such as the portion 13 of the path between the location 12 in the first discharge path 10 and the feed side 6 of the exposure platen 2 in the known apparatus, is thus unnecessary.

In the event of a fault occurring in the making of a copy of an original already discharged from the exposure platen 24 in the copying machine comprising the apparatus shown in FIG. 2, but such that the sheet has not yet completely returned to the cassette 23, the direction of rotation of the sheet conveyor roller 30 can be reversed in response to an associated fault signal when the trailing edge of the original returning to the cassette 23 is situated between location 27 and conveyor roller 30, and sheet deflector 31 set in the broken-line position to return the original to the exposure platen 24 for reexposure of the same side thereof. If the apparatus had been set to discharge originals via the first discharge path 22, such as with two-sided copying, then the original must, of course, pass through the return path an extra time in order to bring the original with the previously exposed side once again to the exposure platen 24. However, in the case of single sided copying wherein the apparatus has been set to discharge originals via the second discharge path 28, the original has not been reversed and therefore can be returned directly for reimaging.

Figure 3:
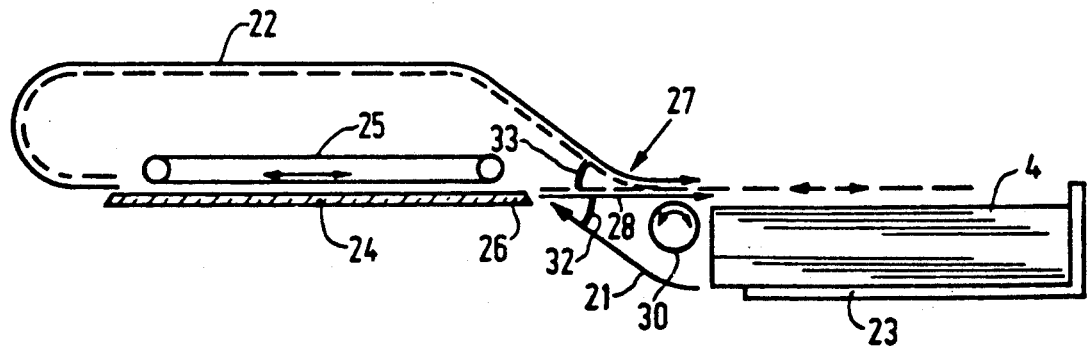

The embodiment shown in FIG. 3 is a variant of the apparatus shown in FIG. 2, with like parts having like references.

In the apparatus shown in FIG. 3, the second discharge or conveyor path 28, the first conveyor path over the exposure platen 24, and that portion of the discharge path which, as considered in the direction of discharge, is situated past location 27, and the terminal portion of the second discharge or conveyor path 28, lie in one and the same plane, so that these path portions smoothly adjoin one another and the feed path 21 and the first discharge path 22 form acute angles 32,33 respectively with the second discharge or conveyor path 28. Thus, when an original is discharged from the exposure platen 24 in the direction of the second discharge or conveyor path 28, it is automatically guided into the path 28 and an original which is conveyed by sheet conveyor roller 30 in a direction opposite to the discharge direction is also guided automatically into path 28, thereby eliminating the use of movable sheet deflectors.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed:

1. The apparatus for recirculating originals from a stack thereof to and from an exposure zone of a copying machine capable of simplex and duplex copying, comprising in combination:

a cassette for stacking originals;

a feed path extending from a bottom of said cassette to a first side of an exposure platen for feeding an original from said bottom of said cassette to said exposure platen without reversal of said original, a reversible sheet conveying means for conveying said original in a first conveyor path above said exposure platen to either discharge said original from a second side of said exposure platen or discharge said original by way of a second conveyor path from said first side of said exposure platen, a discharge path extending from said second side of said exposure platen to said top of said cassette for discharging said original from said exposure platen to said top of said cassette, with reversal of said original, said second conveyor path extending from said first side of said exposure platen to coincide with a terminal portion of said discharge path near said top of said cassette, for returning said original without reversal to said top of said cassette, and a reversible sheet conveyor member positioned in said discharge path, juxtapositioned to where said second conveyor path coincides with said terminal portion of said discharge path at said top of said cassette, said second conveyor path together with said reversible sheet conveyor member functioning to convey said original to said exposure platen after the original has been reversed in the case when said original is discharged from said second side of said exposure platen or to convey said original to said exposure platen without reversal of said original in the case when said original is discharged from said first side of said exposure platen and, in turn, to convey said respective original from said first side of said exposure platen to said top of said cassette without reversal of said original.

2. The apparatus according to claim 1, wherein said second conveyor path is in a common plane with said first conveyor path and said terminal portion of said discharge path, and said second conveyor path forms an acute angle with said feed path and with said discharge path prior to where said terminal portion of said discharge path coincides with said second conveyor path.

3. The apparatus of claim 2, wherein said common plane is situated immediately above said reversible sheet conveyor member.

4. The apparatus of claim 1, wherein said reversible conveying means comprises an endless belt.

5. The apparatus of claim 1, wherein said reversible sheet conveyor member comprises a roller.

* * * * *